Dec. 21, 1965  W. C. HARBART  3,224,784
APPARATUS FOR ROTATING A TOOL
Filed Feb. 25, 1963  2 Sheets-Sheet 1
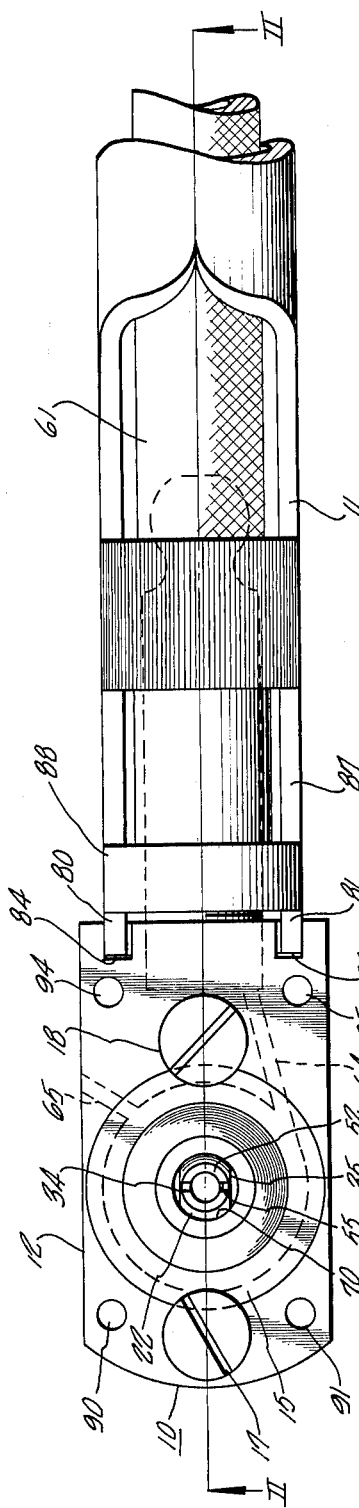
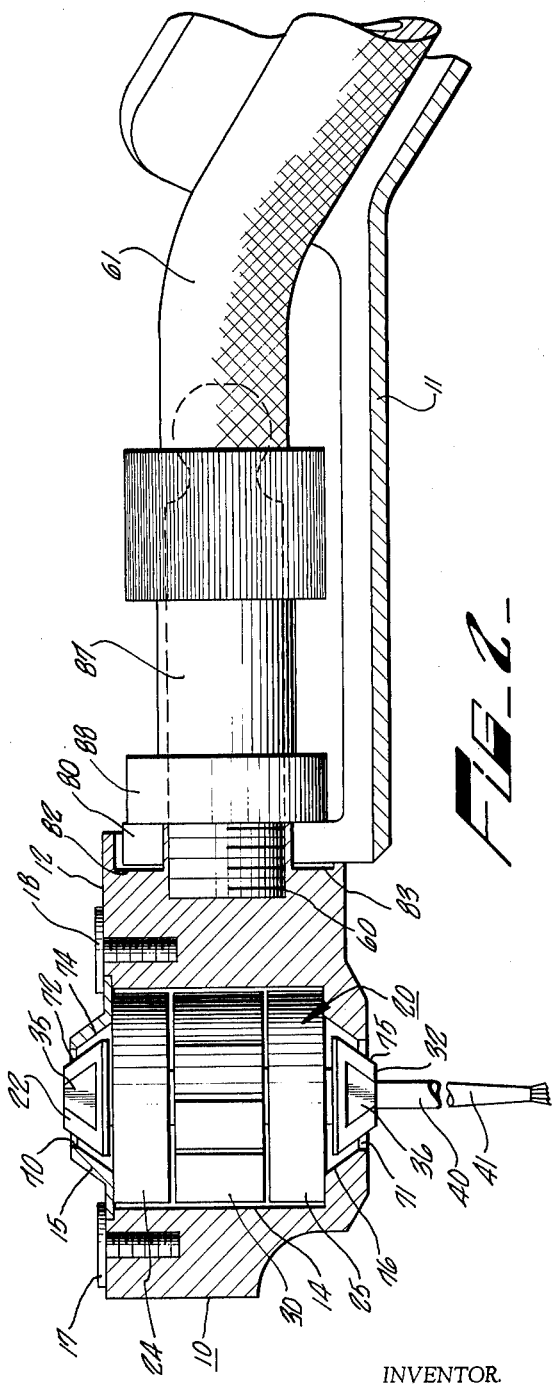
INVENTOR.
WALTER C. HARBART
BY
Christie, Parker & Hale
ATTORNEYS.

INVENTOR.
WALTER C. HARBART
BY
Christie, Parker & Hale
ATTORNEYS.

United States Patent Office 3,224,784
Patented Dec. 21, 1965

3,224,784
APPARATUS FOR ROTATING A TOOL
Walter C. Harbart, 3239 Cahuenga Blvd.,
Los Angeles 28, Calif.
Filed Feb. 25, 1963, Ser. No. 260,755
3 Claims. (Cl. 279—96)

The present invention relates to apparatus for rotating a tool and, more specifically, to dental drilling and similar apparatus.

Apparatus for rotating a tool are well known and have found their widest application as means for rotating a drill. As a rule, these apparatus comprise a chuck mechanism in which the shaft of the tool is releasably held. The chuck mechanism usually has to be actuated by a key or wrench to grip the shaft. These necessary manipulations are not always easily effected, especially when the chuck mechanism is of small size as is, for instance, the case in dental drilling instruments. Great inconvenience in this respect is particularly encountered in the case of the conventional dental turbine drills which require manipulations with a special tool every time a drill is inserted or removed.

In an attempt to overcome this disadvantage, there has been developed a drilling device in which a hollow drill mounting shaft is provided with an inner lining of nylon which has the purpose of frictionally engaging the shaft of a drill. While this makes the use of special keys or wrenches unnecessary, it has been found that these devices not only require the diameter of the tool shaft to be kept within close tolerances, but also are subject to frequent failure and repair, since the nylon linings are worn out in a relatively short time and are then no longer able to transmit the required torque between the drill mounting tube and the drill shaft. In addition, it has been found that the relining of these devices requires the skill of specialized personnel so that the device has to be returned at frequent intervals to the manufacturer or to a servicing facility.

The present invention overcomes these disadvantages and provides an apparatus for rotating a tool in which tool shafts of varying diameter are readily inserted and removed without the use of special keys or wrenches and in which the parts mounting and gripping the tool shaft are subject to less wear than in prior art apparatus and are readily replaceable by a person of ordinary mechanical knowledge.

The apparatus of the invention comprises a rotatably mounted tubular member for receiving the shaft, a solid-walled sleeve of flexible material, say nylon, inside the tubular member, means for compressing the sleeve toward the axis of rotation of the tubular member so that the tool shaft, when inserted, is at all times securely engaged by the sleeve, and means for rotating the tubular member.

In a preferred embodiment of the invention, the means for compressing the sleeve comprise a chuck tube which bears against the sleeve which, in turn, is located between the chuck tube and a shoulder portion inside the tubular member. Preferably, the chuck tube is threadably connected to the tubular member so as to be removable therefrom by rotation of the chuck tube in a sense of rotation opposite to that of the tubular member during operation of the apparatus. In other words, the chuck tube is connected to the tubular member by a left-hand thread if the tubular member is driven in a right-hand direction, and by a right-hand thread if the tubular member is driven in the opposite direction. In this manner, the compression on the flexible sleeve is automatically adjusted by virtue of the inertia of the chuck tube so that there is always sufficient contact between the sleeve and the shaft. The thread connection between the chuck tube and the tubular member should, of course, be sufficiently loose to permit the chuck tube to turn relatively freely in the tubular member.

From another aspect thereof, the invention also provide means for automatically stabilizing the tool during rotation thereof. A preferred embodiment incorporating this feature comprises a tubular member for receiving a tool shaft, a turbine device for driving the tubular member, a housing for the turbine device and tubular member, and means for supplying a pressurized drive medium, such as pressurized air, to the turbine device. The tubular member has a pair of substantially annular opposite end portions, and the housing structure defines a pair of opposite annular clearances adjacent these end portions. Particularly good results have been obtained with frusto-conical end portions and clearance. The pressurized medium, after having driven the turbine, is permitted to escape through these clearances whereby the tubular member and, accordingly, the tool are stabilized in position by the action of the escaping medium on the end portions of the tubular member.

These stabilizing means may be employed in combination with the element described above or, if desired, may also be employed in another type of drilling apparatus or similar device.

The invention will become more readily apparent from the following detailed description of a preferred embodiment thereof, illustrated by way of example in the accompanying drawings, in which:

FIG. 1 is a top view of a dental drilling instrument embodying the invention;

FIG. 2 is a section along lines II—II of FIG. 1; and

Figure 3:
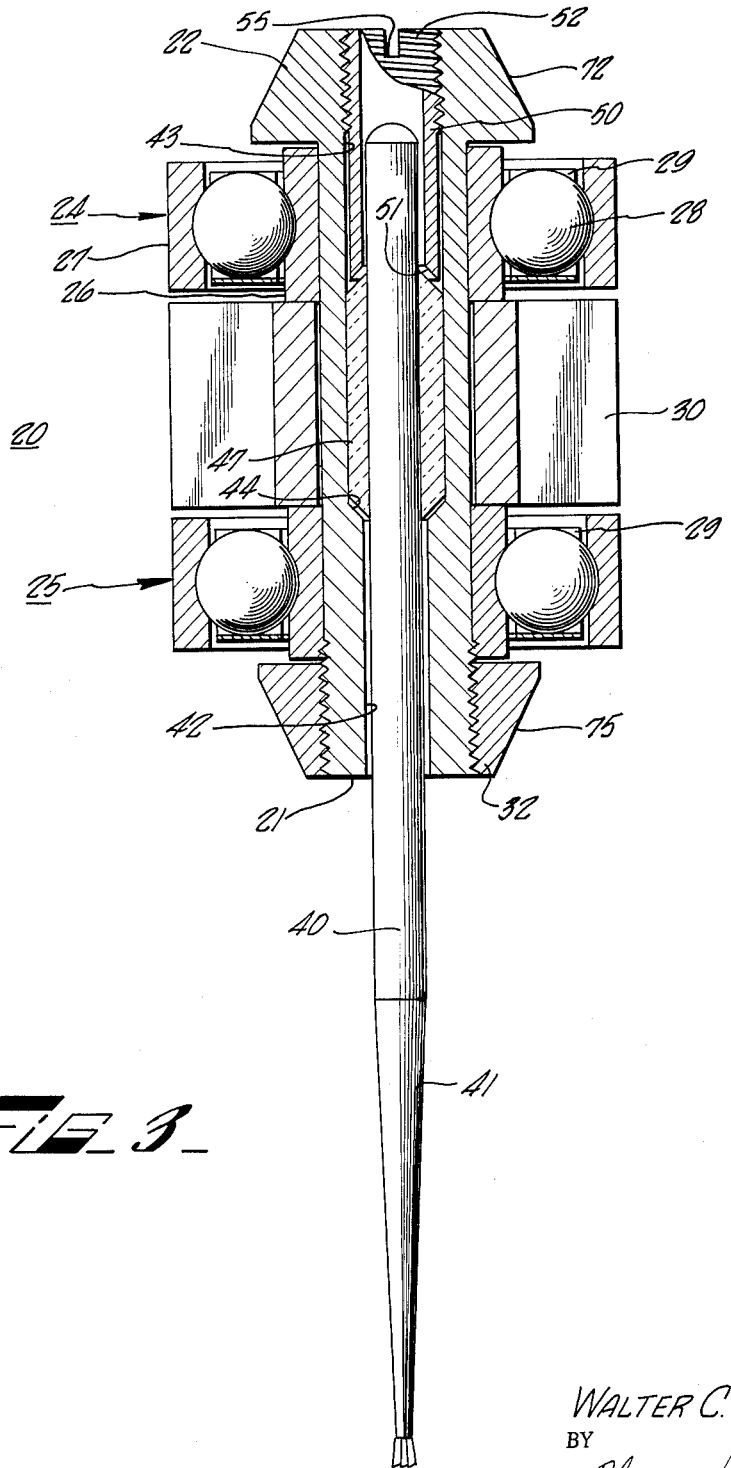
FIG. 3 shows, on an enlarged scale, a detail of the instrument illustrated in FIGS. 1 and 2.

The instrument shown in the drawings comprises a drill head 10 having attached thereto a handle 11 only part of which is shown. The drill head 10 comprises a housing 12 defining a chamber 14. Adjacent the upper end of chamber 14 there is a cover 15 which is removably held on housing 12 by a pair of screws 17 and 18. A rotor element 20 is partially located within chamber 14. The rotor element 20, which is shown in FIG. 3 on an enlarged scale, comprises a tubular member 21 having a head 22. The tubular mmeber 21 is rotatably mounted by a pair of ball bearings 24 and 25, each of which comprises an inner race 26, an outer race 27, and a series of balls 28 held in a cage 29. A turbine rotor 30, which is of the conventional dented wheel-type, serves as a means for driving and rotating tubular member 21 and is interposed between ball bearings 24 and 25. Rotor 30 and bearings 24 and 25 are removably held on tubular member 21 by means of a nut 32 which is threaded on tubular member 21. It will be noted that the inner race 26 of each bearing is higher than the outer race 27 thereof to facilitate the fastening of rotor 30. Alternatively, the rotor 30 could be provided with a hub of increased length. Removal of the rotor 30 and bearings 24 and 25 from tubular member 21 may be facilitated by providing the head 22 with faces 34 and 35 (see FIGS. 1 and 2) and the nut 32 with similar faces, one of which is shown in FIG. 2 at 36.

The tubular member 21 is adapted to receive part of the shaft 40 of a drill or burr 41. To this end, tubular member 21 defines a first bore 42, a second bore 43 having a greater diameter than bore 42, and an internal shoulder 44 having a frusto-conical surface facing the axis of rotation of tubular member 21. A solid-walled sleeve 47 of a flexible material, such as nylon, having frusto-conical end portions, is located in bore 43 so as to be normally in contact with shoulder 44. A chuck tube 50 extends from the head 22 to the sleeve 47 and has a frusto-conical surface 51 at the lower end thereof facing toward the axis of rotation of tubular member 21 and being normally in contact with sleeve 47. Chuck tube 50 is threaded to tubular member 21 at head 22. In the drawings, it has been assumed that tubular member 21 is rotated in a right-hand direction, or clockwise as seen in FIG. 1. In this case the thread 52 on chuck tube 50 is a left-hand thread. If the sense of rotation of tubular member 21 were counterclockwise as seen in FIG. 1, the thread 52 would be a right-hand thread. At any rate, the thread 52 is cut so that the chuck tube 50 is urged to move in the direction of sleeve 47 when the tubular member 21 is rotated. In this manner, the sleeve 47 is automatically compressed against shaft 40 thereby gripping shaft 40 for the transmission of considerable torque. It will be recognized that the action of chuck tube 50 will automatically adjust sleeve 47 to assume an internal diameter corresponding to the outer diameter of shaft 40 when the sleeve 47 should become worn out. By the same token, sleeve 47 will also conform to drill shafts of smaller diameter. In addition, sleeve 47, being of flexible material, will also permit the insertion of drills of a diameter slightly larger than that of illustrated shaft 40. In this manner, shafts of drills, brushes, sandpaper or carborundum disks or of other tools can be inserted in tubular member 21, as long as the variation in diameter among the shafts of the various tools is not too large. In the field of dentistry the turbine drill instruments are usually employed for driving only drills, as these turbine instruments operate at a very high speed.

It should now be understood that drill shafts can be manually inserted in tubular member 21 without the aid of keys or wrenches. The drills can also be removed from drill head 10 without the aid of keys or wrenches. Thus, the drill could, for instance, be gripped by hand and pulled out of the tubular member 21. If the projecting portion of shaft 40 is fairly short, the shaft 40 could be pushed out through chuck tube 50 by holding the lower end of drill 41 against a piece of plastic or wood and applying a downward force to drill head 10, whereupon the shaft could be gripped and the drill manually removed. Finally, if the active part of the drill is very delicate, a simple pin could be used to push out the drill. Again, no special keys or wrenches are necessary.

Replacement of a worn out sleeve is very easily effected simply by turning chuck tube 50 by means of a screwdriver applied to a pair of registering slots, one of which is shown in FIG. 3 at 55. After the chuck tube 50 has been removed in this manner, the sleeve is shaken out and a fresh sleeve is put in its place. All this is effected by means of an ordinary screwdriver of adequate size. It will be noted that the sleeve 47 is of a very simple configuration so that it can be manufactured a low cost. In this manner, the costs for replacing a worn out sleeve are very low.

The illustrated instrument further comprises a hollow nipple 60 which is adapted to receive a hose 61 for supplying a pressurized drive medium, such as pressurized air, to the turbine device 30. The channel through which such drive medium is supplied from nipple 60 to turbine device 30 is indicated in FIG. 1 by dotted lines at 64. If desired, the pressurized medium may be permeated with a lubricant, such as a fine oil spray, for the bearings 24 and 25. A channel of the type shown in FIG. 1 by dotted lines at 65 may be used to permit part of the drive medium to escape from the drill head after having driven the turbine device 30. The provision of such channel 65 is very advantageous since it will permit a small part of the bearing lubricant to escape and to form a small drop at the outer end of channel 65, thereby indicating to the operator of the drill that the lubricant system is working.

A large part of the drive medium is, however, permitted to escape through annular clearances 70 and 71. Clearance 70 is defined by head 22 which has a frusto-conical surface 72 and cover 15 which has a corresponding frusto-conical surface 74. Clearance 71 is defined by nut 36 which has also a frusto-conical surface 75 and housing 12 which defines a corresponding frusto-conical surface 76. Part of the drive medium, say air, leaving turbine 30 flows past the spaced balls 28 of bearings 24 and 25 and escapes through clearances 70 and 71 thereby stabilizing the rotating tubular member 21, the turbine wheel 30 and drill 41 so that the common axis of rotation of these parts is in the desired position with respect to housing chamber 14. This stabilizing action is due to the forces developed by the escaping medium at surfaces 72 and 75. If desired, a porous washer (not shown) of a suitable material, such as phenolic resin, may be inserted in the clearance between inner race 26 and outer race 27 of each ball bearing. In this manner, the lubricant contained in the drive medium is retained at the bearings, while the drive medium per se is permitted to escape through clearances 70 and 71.

It will be appreciated that this stabilizing feature could also be incorporated in drilling or similar instruments which do not comprise the illustrated shaft-retaining structure.

The handle 11 may be attached to drill head 10 in the manner shown in my copending application Serial No. 237,656, filed November 14, 1962. To this end, handle 11 may be provided with two prongs 80 and 81 and drill head 10 with two pairs of parallel grooves 82, 83, 84 and 85 as shown in my aforesaid copending application. In addition, a manually actuable tubular member 87 having a shoulder portion 88 may be threaded on nipple 60. This member is also shown in my aforesaid copending application and serves to retain the prongs 80 and 81 in releasable engagement with drill head 10.

Furthermore, the drill head 10 may be provided with a pair of bores 90 and 91 (see FIG. 1) which extend parallel to tubular member 21 and serve to receive the parallel guides disclosed in my aforesaid copending application. If desired, two further bores 94 and 95 may be provided in drill head 10 as shown in FIG. 1. These bores 94 and 95 are also parallel to tubular member 21 and serve to receive either guide pin of the parallel guide shown in my aforesaid copending application.

Various other modifications within the scope of the invention of the illustrated embodiment will be apparent to those skilled in the art.

I claim:

1. Apparatus for rotating a tool having a shaft, comprising a rotatably mounted tubular member for receiving said shaft, the tubular member defining a first bore extending from one end of the tubular member and a second bore having a diameter larger than that of the first bore and extending from the first bore to the other end of the tubular member, a solid-walled sleeve of flexible material inside the second bore, means for rotating the tubular member in a first sense of rotation as seen from said other end of the tubular member, and a chuck tube extending in the second bore from said other end of the tubular member to the sleeve for compressing the sleeve toward the axis of rotation of the tubular member, the chuck tube being threadably connected to the tubular member to be removable from the tubular member by rotation of the chuck tube in a sense opposite to said first sense of rotation.

2. Apparatus for rotating a tool having a shaft, comprising a rotatably mounted tubular member for receiving said shaft, the tubular member defining a first bore extending from one end of the tubular member to a point inside the tubular member and a second bore having a diameter larger than that of the first bore and extending from the first bore to the other end of the tubular member, a solid-walled sleeve of flexible material inside the second bore, means for rotating the tubular member in a clockwise sense as seen from the other end of the tubular member, and a chuck tube extending in the second bore from said other end of the tubular member to the sleeve from compressing the sleeve toward the axis of rotation of the tubular member, the chuck tube being threadably connected to the tubular member by a left-hand thread.

3. Apparatus for rotating a tool having a shaft, comprising a rotatably mounted tubular member for receiving said shaft, the tubular member defining a first bore extending from one end of the tubular member to a first point inside the tubular member, a second bore having a diameter larger than that of the first bore and extending from the other end of the tubular member to a second point inside the tubular member adjacent said first point, and to shoulder portion having a frustoconical surface facing toward the axis of rotation of the tubular member and extending from said first point to said second point, a solid-walled sleeve of flexible material inside the second bore, means for rotating the tubular member in a first sense of rotation as seen from said other end of the tubular member, a chuck tube for compressing the sleeve toward the axis of rotation of the tubular member, the chuck tube extending in the second bore from said other end of the tubular member to the sleeve and having a frustoconical surface facing toward the axis of rotation of the tubular member and contacting the sleeve, and the chuck tube being threadably connected to the tubular member to be removable from the tubular member by rotation of the chuck tube in a sense opposite said first sense of rotation.

References Cited by the Examiner
UNITED STATES PATENTS

| | | | |
|---|---|---|---|
| 2,468,946 | 5/1949 | Sherman | 279—102 |
| 2,469,198 | 5/1949 | La Pointe | 279—102 |
| 2,989,317 | 6/1961 | Staunt | 279—102 |
| 3,070,381 | 12/1962 | Saffir | 279—102 |
| 3,083,946 | 4/1963 | Kern | 253—2 |
| 3,088,707 | 5/1963 | Williams | 253—2 |

FOREIGN PATENTS 847,331  9/1960  Great Britain.

ROBERT C. RIORDON, *Primary Examiner.*

FRANK SUSKO, *Examiner.*